United States Patent
Hsieh et al.

(10) Patent No.: US 7,260,068 B2
(45) Date of Patent: Aug. 21, 2007

(54) METHOD FOR SWITCHING A TIME FRAME BASED MOBILE UNIT TO A SLEEP MODE

(75) Inventors: Yu-Cheng Hsieh, Kao-Hsiung Hsien (TW); Sheng-Der Chin, Chia-I (TW)

(73) Assignee: Mediatek Inc., Science-Based Industrial Park, Hsin-Chu, Hsien (TW)

( * ) Notice: Subject to any disclaimer, the term of this patent is extended or adjusted under 35 U.S.C. 154(b) by 659 days.

(21) Appl. No.: 10/707,872

(22) Filed: Jan. 20, 2004

(65) Prior Publication Data

US 2004/0146030 A1 Jul. 29, 2004

(30) Foreign Application Priority Data

Jan. 23, 2003 (TW) ................. 92101528 A

(51) Int. Cl.
G08C 17/00 (2006.01)
H04B 7/204 (2006.01)

(52) U.S. Cl. ............... 370/311; 370/321; 370/337; 370/347; 370/354; 455/574; 455/343.1

(58) Field of Classification Search ............ 370/311, 370/321, 337, 347, 442; 455/574, 343.1, 455/550, 552, 502
See application file for complete search history.

(56) References Cited

U.S. PATENT DOCUMENTS 5,519,710 A * 5/1996 Otsuka .................. 370/337
6,212,398 B1 * 4/2001 Roberts et al. ........... 455/502
7,149,555 B2 * 12/2006 Suda ....................... 455/574

* cited by examiner

Primary Examiner—William Trost
Assistant Examiner—Julio Perez
(74) Attorney, Agent, or Firm—Winston Hsu

(57) ABSTRACT

Method for recovering frame timing of a mobile communication device performing a sleep mode. The mobile communication device communicates with a base station through a communication system so that wireless signals are transmitted via frames. The method includes executing a synchronous task for interrupting currently loaded control processes in a real-time operating system and for calculating a predetermined sleep period for the sleep mode, executing the synchronous task for driving the mobile communication device to enter the sleep mode during an actual sleep period, and executing the synchronous task for synchronizing frame timing of the mobile communication with frame timing of the base station according to the actual sleep period.

26 Claims, 7 Drawing Sheets

METHOD FOR SWITCHING A TIME FRAME BASED MOBILE UNIT TO A SLEEP MODE

BACKGROUND OF INVENTION

1. Field of the Invention

The present invention relates to a method of controlling frame timing of a mobile communication device. More specifically, the present invention discloses a method for controlling frame timing of a mobile communication device performing a sleep mode.

2. Description of the Prior Art

A wireless communication system includes a plurality of base stations. Each base station corresponds to a cell, and is used to control signal reception and signal transmission of a plurality of mobile units located at the cell. The mobile units mostly are portable communication devices or mobile communication devices. For instance, within a global system for mobile communications (GSM), the above-mentioned mobile units are cellular phones.

In order to allow the cellular phones to be conveniently carried, the cellular phones currently adopt rechargeable batteries to provide required operating voltages. Obviously the capacity of the rechargeable battery is limited. If a rechargeable battery with great power capacity is used by a cellular phone to increase overall operational time of the cellular phone, the rechargeable battery substantially increases the size and weight of the cellular phone so that it is not convenient to carry the bulky cellular phone. Therefore, how to decrease the power consumption of the cellular phone has become an important issue. When the power consumption of the cellular phone is reduced, the cellular phone is capable of using a rechargeable battery with a smaller power capacity, a smaller size, and a reduced weight to achieve the same operational time. In other words, the cellular phone becomes more convenient for the user to operate it.

In order to reduce power consumption of the cellular phone, it is well-known that the cellular phone performs a sleep mode to reduce power dissipation. For example, when the cellular phone does not receive signals or transmit signals, and the user does not operate the cellular phone, the cellular phone enters an idle mode. The cellular phone, therefore, does not need a clock signal to perform certain operations, and then the cellular phone enters the sleep mode to stop the clock signal from driving components in the cellular phone. In other words, unnecessary power dissipated during the idle mode is cut. The cellular phone then achieves an objective of saving power.

However, it is well-known that the GSM utilizes a communication scheme, such as a time division multiple access (TDMA) scheme, a wideband code division multiple access (WCDMA) scheme, or a code division multiple access (CDMA) scheme, to perform signal transmission. Timing of the mobile unit needs to be synchronized with frame timing of a corresponding base station so that the mobile unit is capable of receiving signals and transmitting signals. The prior art wireless communication system transmits a paging signal to the mobile unit to inform the mobile unit of an incoming call. Therefore, the timing of the mobile unit has to be synchronized with the timing of the base station to correctly receive the paging signal. Even though the mobile unit has entered the sleep mode for saving power, the mobile unit should periodically recover from the sleep mode to detect if the wireless communication system is transmitting the paging signal. In other words, when the mobile unit escapes from the sleep mode, the mobile unit needs to recover its timing to be synchronized with timing of the prior art wireless communication system.

Please refer to FIG. 1, which is a circuit diagram of a prior art mobile unit 40. The mobile unit 40 has an antenna 42, a transceiver 44, a timing generator 46, a micro-controller 48, a clock generator 50, and a memory 52. The antenna 42 is capable of receiving radio frequency (RF) signals outputted from a base station 41, and is capable of transmitting RF signals outputted from the mobile unit 40 toward the base station 41. The transceiver 44 is capable of converting RF signals outputted from the antenna 42 into corresponding low-frequency baseband signals, and then delivers the baseband signals to the micro-controller 48. In addition, the transceiver 44 is also capable of converting baseband signals into corresponding high-frequency RF signals, and then outputs the RF signals from the antenna 42.

The micro-controller 48 executes a real-time operating system (RTOS) 54 stored in the memory 52 for controlling overall operation of the mobile unit 40. That is, the micro-controller 48 processes control signals and information signals generated from the base station 41, where the control signals are used to set the required communication protocol used by the mobile unit 40 and the base station 41. The information signals are speech signals or data signals transmitted between a caller and a listener. The clock generator 50 is used to generate a system clock CLK for driving the micro-controller 48 to control the mobile unit 40. In addition, the timing generator 46 generates timing signals according to the system clock CLK, and the timing signals are used to control timing of the mobile unit 40 to be synchronized with the timing of the base station 41 so that the transceiver 44 can transmit and receive signals successfully.

Please refer to FIG. 2, which is a flow chart illustrating operation of the sleep mode run by the mobile unit 40 shown in FIG. 1. The sleep mode run by the mobile unit 40 has the following steps.

Step 100: Start.
Step 102: Perform a sleep manager 56.
Step 104: Check if the mobile unit 40 enters an idle mode through the sleep manager 56. If the mobile unit 40 enters the idle mode, go to step 106; otherwise, go to step 120.
Step 106: Calculate a predetermined running period of the sleep mode for the mobile unit 40 through the sleep manager 56.
Step 108: The mobile unit 40 enters the sleep mode.
Step 110: Run a synchronous task 58 before the system clock of the mobile unit 40 is interrupted from driving the micro-controller 48.
Step 112: Use the synchronous task 58 to detect if the mobile unit 40 is triggered by an external event to abort the sleep mode. If the external event occurs, go to step 118; otherwise, go to step 114.
Step 114: Calculate an actual running period of the sleep mode performed by the mobile unit 40 through the synchronous task 58.
Step 116: Use the synchronous task 58 to control the timing generator 46 for recovering timing of the mobile unit 40 to make timing of the mobile unit 40 synchronized with timing of the base station 41.
Step 118: Terminate the synchronous task 58.
Step 120: Terminate the sleep manager 56.
Step 122: Finish.

As mentioned above, the micro-controller 48 executes the RTOS 54 to control operation of the mobile unit 40. When the micro-controller 48 runs a sleep manager 56, the sleep manager 56 is activated to drive the mobile unit 40 to enter the sleep mode with the system clock CLK stopped from driving the micro-controller 48, then the operation of the mobile unit 40 is interrupted. According to the prior art, the sleep manager 56 is a task with a lowest priority. Therefore, when the sleep manager 56 is successfully executed by the micro-controller 48 (step 102), it means that other tasks with greater priorities have entered the same idle mode. In other words, the mobile unit 40 enters the idle mode now (step 104). Then, the sleep manager 56 starts calculating a predetermined running period of the sleep mode performed by the mobile unit 40 according to information provided by the RTOS 54 (step 106). Next, the sleep manager 56 begins controlling the clock generator 50 to stop the system clock CLK from driving the mobile unit 40 (step 108). However, before the system clock CLK of the mobile unit 40 is actually cut from driving the micro-controller 48, the micro-controller 48 runs a synchronous task 58 (step 110) that is an interrupt service routine (ISR). The synchronous task 58 detects if the mobile unit 40 is trigged by an external event to abort the sleep mode. If an external event (one key pressed by a user for example) is detected by the mobile unit 40, the sleep mode is aborted before the system clock CLK stops driving the micro-controller 56 (step 120). On the other hand, if an external event is not detected before the system clock CLK stops driving the micro-controller 48, the synchronous task 58 will calculate an actual running period of the sleep mode performed by the mobile unit 40. Because the external event might be triggered during the time that the mobile unit 40 is running the sleep mode, the sleep mode then will be terminated immediately to enable the system clock CLK to continue driving the micro-controller 48 for executing an associated ISR. Therefore, the actual running period of the sleep mode might be less or equal to the predetermined running period. In the end, when the system clock CLK drives the micro-controller 48 again, the synchronous task 58 controls a timing signal, which is outputted from the timing generator 46 and inputted into the transceiver 44, for recovering the timing of the mobile unit 40 to be synchronized with the timing of the base station 41 according to the actual running period (step 116). Then, the synchronous task (step 118) and the sleep manager 56 (step 120) are sequentially terminated to complete overall timing recovery operation corresponding to the sleep mode.

As mentioned above, the sleep manager 56 is a task having a lowest priority to check if the mobile unit 40 corresponds to an idle mode. However, when step 106 is executed to calculate the predetermined running period of the sleep mode, the sleep manager 56 currently running step 106 is interrupted if an ISR corresponding to a higher priority is triggered. If the sleep manager 56 constantly interrupted by other ISRs having higher priorities, the sleep manager 56 requires a long period of time to complete step 106 for obtaining the predetermined running period. In addition, from the flow chart shown in FIG. 2, the prior art needs the sleep manager 56 and the synchronous task 58 to respectively activate the sleep mode and the timing recovery operation after the sleep mode is terminated. It is obvious that many interrupt events and exception events should be considered during programming the sleep manager 56 and the synchronous task 58. In addition, the sleep manager 56 and the synchronous task 58 belong to different processes. Because operation of the sleep mode performed by the mobile unit 40 involves coordination among different processes, operation of the sleep mode becomes more complicated as compared with a single process controlling the sleep mode.

SUMMARY OF INVENTION

It is therefore a primary objective of this invention to provide a method for controlling timing of a mobile unit through an interrupt service routine having a highest priority.

Briefly summarized, the claimed invention discloses a method for controlling the timing of a mobile unit. The mobile unit is connected to a base station via radio communication. The base station transmits wireless signals to the mobile unit according to a plurality of frames within a communication system, such as a time division multiple access (TDMA) system, a wideband code division multiple access (WCDMA) system, or a code division multiple access (CDMA) system. The mobile unit includes a micro-controller unit for running a real-time operating system to load a plurality of control procedures used to control operation of the mobile unit, the control procedures include a synchronous task, a timing generator electrically connected to the micro-controller unit for controlling the timing of the mobile unit corresponding to the frames, and a clock generator electrically connected to the micro-controller unit for generating a first clock signal to drive the micro-controller unit.

The method includes using the micro-controller unit to execute the synchronous task for interrupting other control procedures currently loaded by the real-time operating system, using the synchronous task to calculate a predetermined sleep period for a sleep mode that is used to stop the first clock signal from driving the micro-controller unit, using the micro-controller unit to execute the synchronous task for driving the mobile unit to stop the first clock signal from driving the micro-controller unit during an actual sleep period, and using the micro-controller unit to execute the synchronous task for controlling the timing generator to synchronize timing of the mobile unit with the timing of the base station according to the actual sleep period.

It is an advantage of the claimed invention that the claimed method adopts one interrupt service routine with a highest priority to simultaneously control an execution of the sleep mode and an operation of recovering timing. Because the used interrupt service routine has the highest priority, other programs or other interrupt service routines are not permitted to interrupt operations run by the used interrupt service routine. Therefore, the mobile unit performs the sleep mode much more efficiently to reduce power consumption. In addition, the life of the battery is extended. The claimed method provides a simple scheme and an efficient way to manage operation of the sleep mode.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
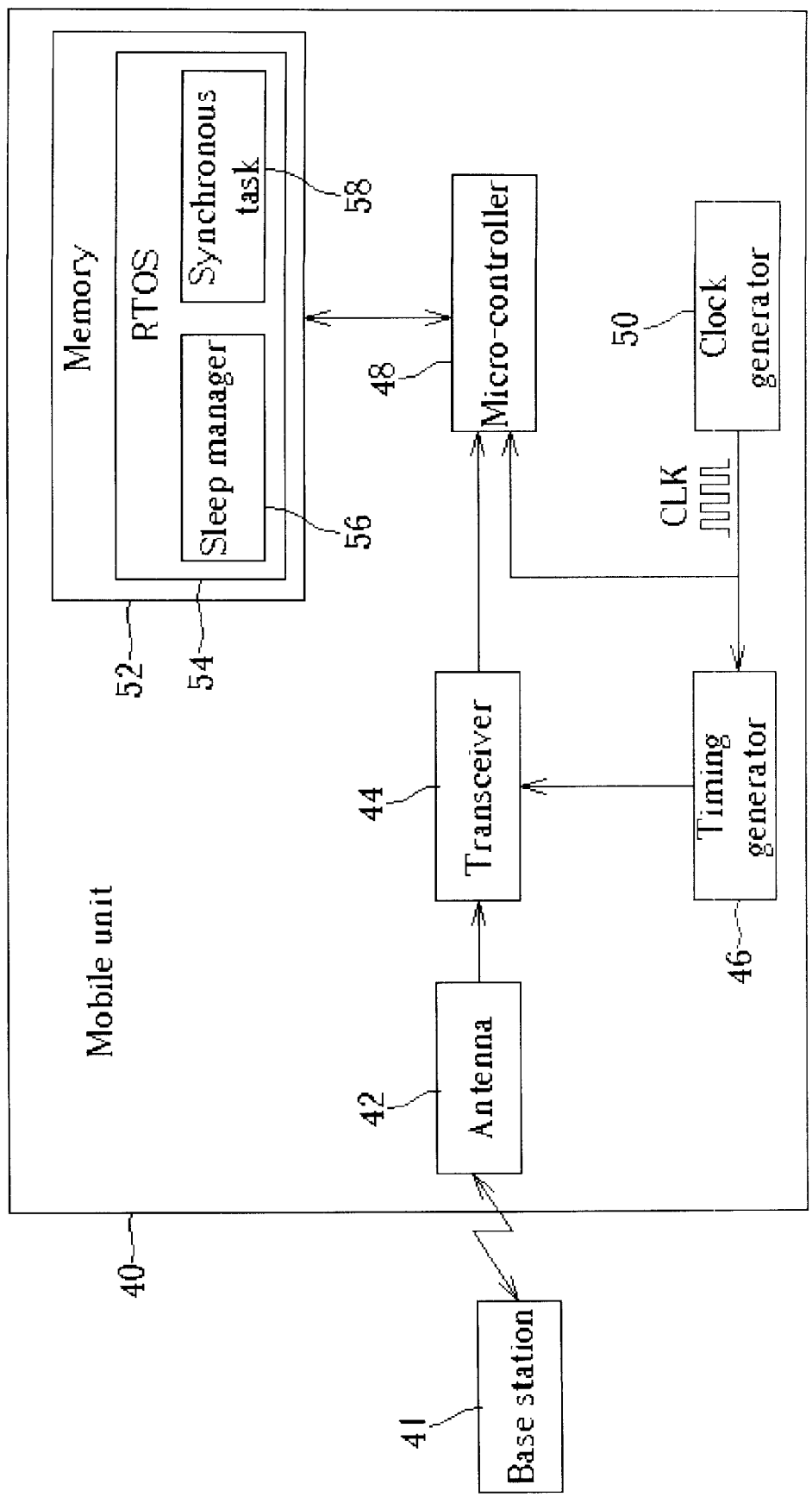
FIG. 1 is a circuit diagram of a prior art mobile unit.
Figure 2:
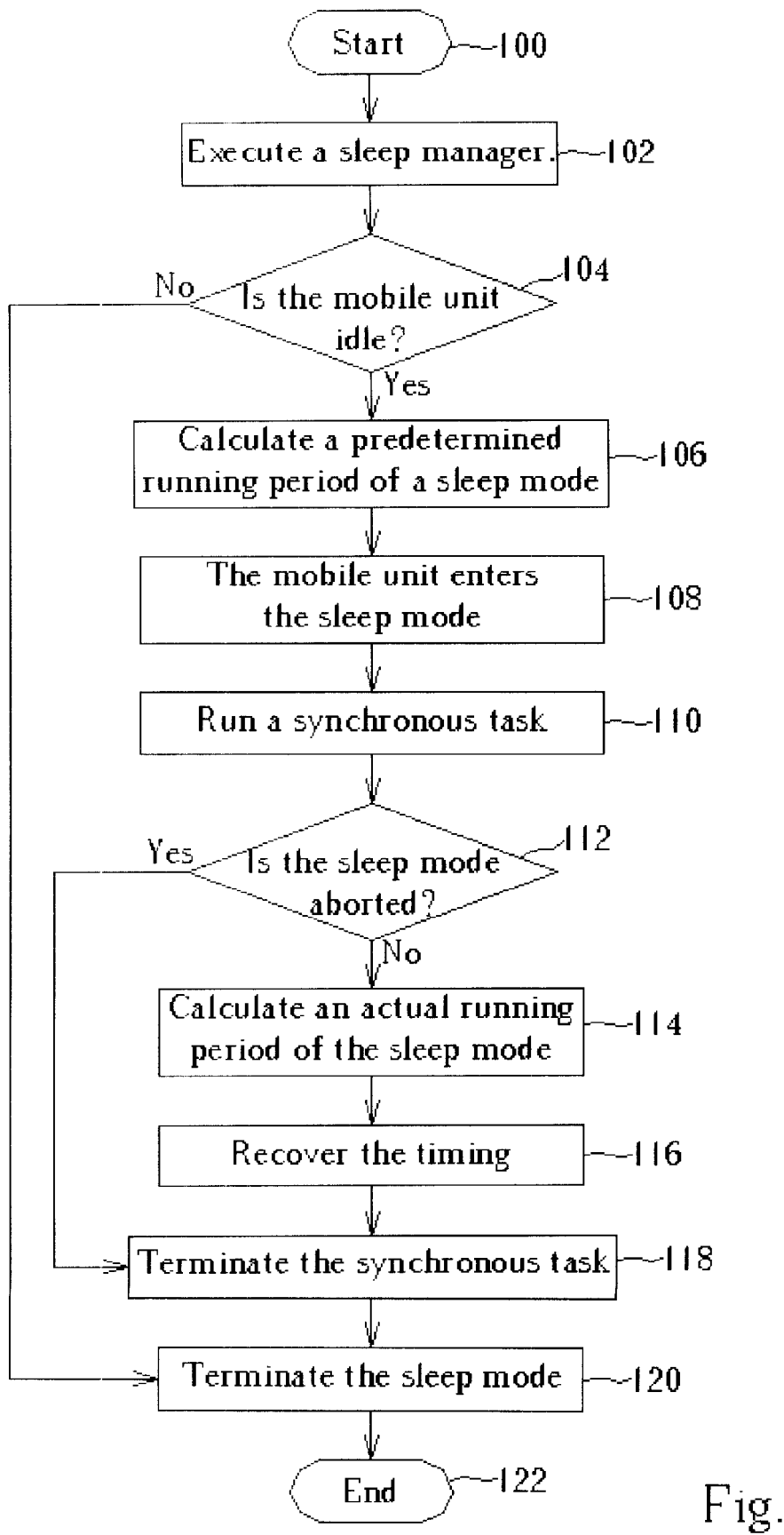
FIG. 2 a flow chart illustrating the operation of a sleep mode run by the mobile unit of FIG. 1.
Figure 3:
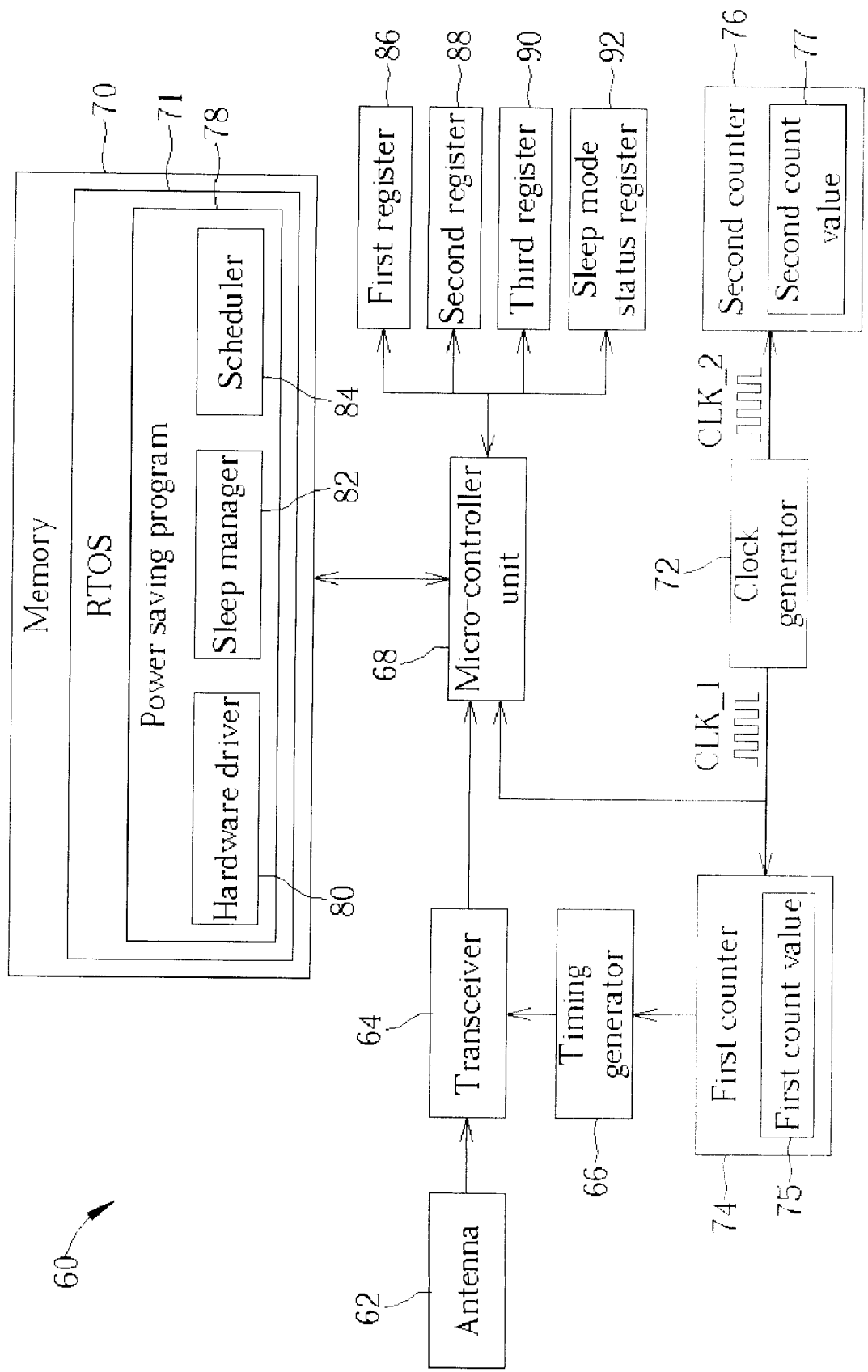
FIG. 3 is a block diagram of a mobile unit according to the present invention.

Please refer to FIG. 3, which is a block diagram of a mobile unit 60 according to the present invention. The mobile unit 60 includes an antenna 62, a transceiver 64, a timing generator 66, a micro-controller unit (MCU) 68, a memory 70, a clock generator 72, a first counter 74, a second counter 76, a first register 86, a second register 88, a third register 90, and a sleep mode status register 92.

The antenna 62 is capable of receiving RF signals outputted from a base station and is also capable of transmitting RF signals generated from the mobile unit 60 such as a cellular phone toward the base station. The transceiver 64 can convert RF signals generated from the base station into low-frequency baseband signals, and delivers the baseband signals to the MCU 68. In addition, the transceiver 64 also can convert baseband signals outputted from the MCU 68 into high-frequency RF signals and the RF signals are outputted through the antenna 62.

The MCU 68 such as a micro-controller is used to execute a real-time operating system (RTOS) 71 loaded into the memory 70 for control overall operation of the mobile unit 60. That is, the MCU 68 activates a plurality of control procedures to handle control signals and information signals generated from the base station and uses the control procedures to transmit control signals and information signals generated from the mobile unit 60. The control signals are used to set communication protocol used by the mobile unit 60 and the corresponding base station. The information signals are speech signals or data signals communicated between a caller and a listener.

The clock generator 70 is used to generate a first clock signal CLK_1 and a second clock signal CLK_2. The first clock signal CLK_1 is a high-frequency signal used to drive the MCU 68 to control operation of the mobile unit 60, and the second clock signal CLK_2 is a low-frequency signal used to count an actual running period corresponding to a sleep mode. When the sleep mode is actuated, the first clock signal CLK_1 stops feeding the MCU 68 to reduce power consumption. The first counter 74 is used to count cycles of the first clock signal CLK_1 to calculate a first count value 75. Then the timing generator 66 generates a timing signal according to the first count value 75 and the timing signal is used to control the timing of the mobile unit 68 be synchronized with the timing of the base station. Therefore, the transceiver 64 is capable of correctly transmitting and receiving signals.

For instance, suppose that a frame period adopted by the base station is equal to T, a period of the first clock signal CLK_1 is equal to t (T>t), and a predetermined count value is equal to n (T=n*t). Please note that the predetermined count value is stored in the first register 86. When the base station starts operating according to frames, the first counter 74 counts cycles of the first clock signal CLK_1 based on an initial value (0 for example). That is, each cycle of the first clock signal CLK_1 makes the first count value 75 increased by 1. When the first count value 75 is equal to the predetermined count value, the mobile unit 60 then acknowledges that one frame period of the base station has passed, and the next frame period is ready to begin. Therefore, the first count value 75 is reset to be the initial value, and first clock signal CLK_1 is counted again to determine ending time of this frame period.

According to the above-mentioned operation, the mobile unit 60 can determine when a frame used by the base station starts and when this frame used by the base station finishes. That is, the timing of the mobile unit 60 is capable of being synchronized with the timing of the base station. However, the period t of the first clock signal CLK_1 and the period T of the frame period do not exactly correspond to an integral ratio. That is, even if n*t is close to T, the product of n and t is not precisely equal to T. Though a difference between n*t and T is small, a deviation (±Δn) exists between a resetting time of the first count value 75 and an end time of the frame period after the first counter 74 continuously uses the predetermined count value n to determine a plurality of frame periods used by the base station for a period of time. As a result, the mobile unit 60 is unable to correctly determine the end time of following frame periods. Therefore, the timing of the mobile unit 60 is not synchronized with the timing of the base station at this time.

In order to make the resetting time of the first count value 75 synchronized with the end time of a following frame, the predetermined count value is modified to be n±Δn when the first counter 74 operates during the following frame. In the end, the timing of the mobile unit 60 is synchronized with timing of the base station again. Then, the predetermined count value n is recovered to help the first counter 74 to determine the beginning and finish of each frame used by the base station. In other words, with periodical adjustments of the predetermined count value n, timing of the mobile unit 60 is kept synchronized with timing of the base station.

In the preferred embodiment, the first count value 75 gradually increases an initial value by 1 until the first count value 75 equals the predetermined value. However, the first count value 75 can also gradually increase an initial value by an integer k until the first count value 75 equals the predetermined value. Similarly, the first count value 75 can also gradually decrease the predetermined value by the integer k until the first count value 75 equals the initial value. From each operation mentioned above, the same objective of calculating the frame period is achieved. It is obvious that the second counter 76 can count the second clock signal CLK_2 to gradually increase an initial value by an integer k for obtaining a second count value 77, or the second counter 76 can count the second clock signal CLK_2 to gradually decrease a predetermined value by the integer k for obtaining the second count value 77.

In the preferred embodiment, the MCU 68 executes a synchronous task 78 through the RTOS 71. The synchronous task 78 is an interrupt service routine (ISR). Among the control procedures run by the RTOS 71, please note that the MCU 68 assigns a highest priority to the synchronous task 78. The synchronous task 78 is mainly used to perform hardware setting associated with signal communication between the mobile unit 60 and the corresponding base station and is also used to schedule utilization of hardware resources in the mobile unit 60. In addition, the mobile unit 60 performs the synchronous task 78 to make the timing of the mobile unit 60 synchronized with the timing of the base station.

The synchronous task 78 includes a hardware driver 80, a sleep manager 82, and a scheduler 84. The hardware driver 80 is used to control the hardware setting. The sleep manager 82 is used to check if the mobile unit 60 enters an idle mode. If the mobile unit 60 is idle, the mobile unit 60 is safe to enter the sleep mode. In addition, the sleep manager 82 also informs the scheduler 84 of starting the timing recovery operation after the sleep mode has been terminated. The scheduler 84 controls the hardware driver 80 to process schedule management of the hardware resource according to a protocol stack adopted by the mobile unit 60. For instance, hardware of the mobile unit 60 associated with signal transmission and signal reception is scheduled to operate in order for correctly completing the above-mentioned signal processing operations.

Figure 4:
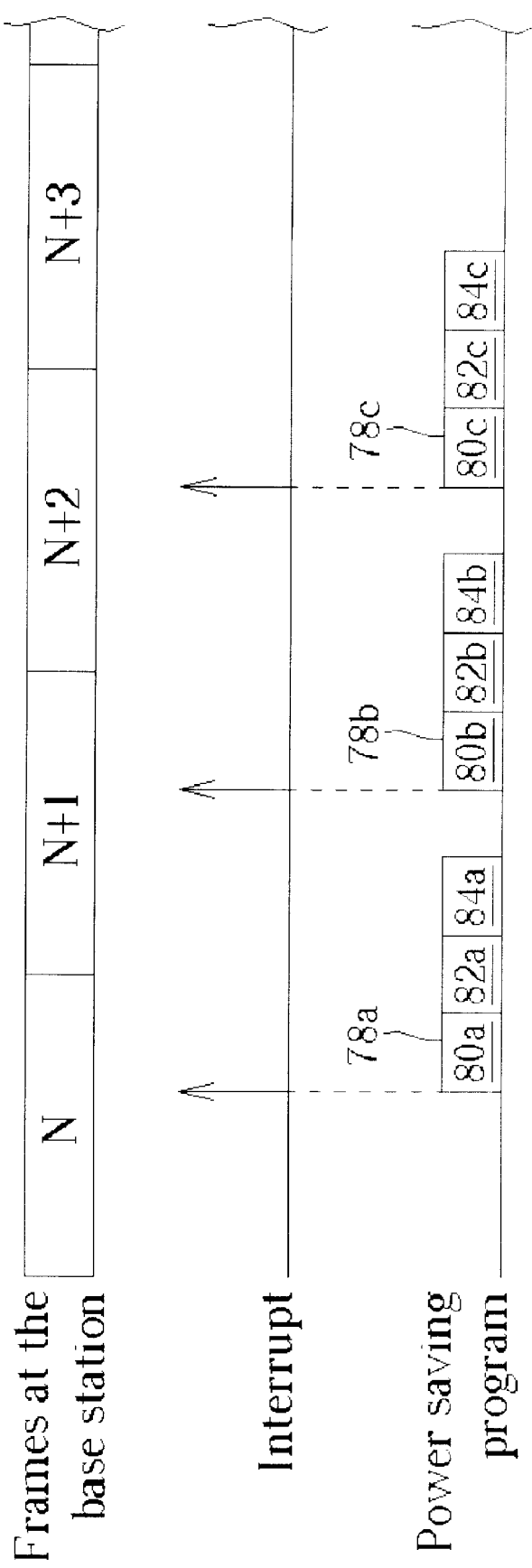
FIG. 4 is a diagram illustrating the operation of a synchronous task shown in FIG. 3.

Please refer to FIG. 4, which is a diagram illustrating operation of the synchronous task 78 shown in FIG. 3. The synchronous task 78 is an ISR. That is, the MCU 68 triggers an interrupt to perform the corresponding synchronous task 78. As shown in FIG. 4, the mobile unit 60 periodically triggers the interrupt within each frame used by the base station. During a frame N, the synchronous task 78a is executed. The hardware driver 80a starts setting hardware so that the mobile unit 60 can operate correctly to receive or transmit signals during a next frame N+1. The sleep manager 82a then judges if the sleep mode can be actuated, and the sleep manager 82a will transfer parameters associated with a timing recovery operation to the scheduler 84a after the sleep mode is finished. The scheduler 84a then schedules hardware resources of the mobile unit 60 needed during a frame N+2.

When the synchronous task 78b is performed during the next frame N+1, the hardware driver 80b immediately receives parameters outputted from the scheduler 84a of the previously executed synchronous task 78a to determine the hardware setting. If the synchronous task 78a detects that the timing of the mobile unit 60 is not synchronized with the timing of the base station, the scheduler 84a in the synchronous task 78a commands the hardware driver 80b of the following synchronous task 78b to modify the predetermined count value. That is, the timing of the mobile unit 60 will be synchronized with the timing of the base station after the frame N+1 is ended. Similarly, the sleep manager 82b is performed to check if the sleep mode can be actuated and then the scheduler 84b performs schedule management for the hardware resources that are required during a frame N+3. When the frame N+1 is ended, the timing of the mobile unit 60 is synchronized with timing of the base station. Therefore, when a following synchronous task 78c is performed during the frame N+2, the hardware driver 80c still adopts the original predetermined count value for calculating frame period of the frame N+2. Identical operation of the sleep manager 82c and the scheduler 84c has been described above. Therefore, the lengthy description is skipped for simplicity.

Figure 5:
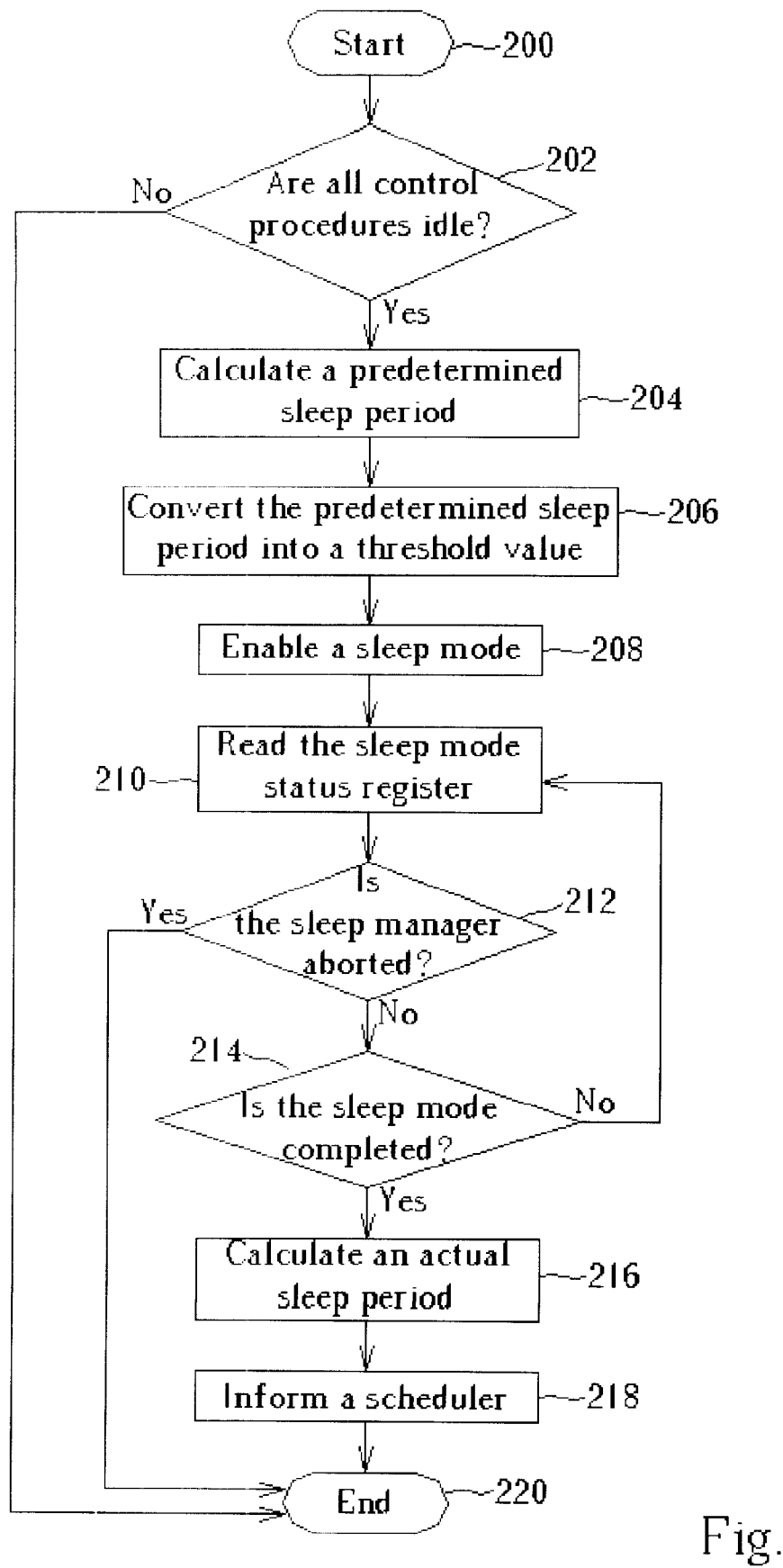
FIG. 5 is a flow chart illustrating the operation of a sleep manager shown in FIG. 3.

Please refer to FIG. 5, which is a flow chart illustrating operation of the sleep manager 82 shown in FIG. 3. Operation of the sleep manager 82 includes following steps.

Step 200: Start.

Step 202: Check if all of the currently loaded control procedures are idle. If yes, go to step 204; otherwise, go to step 220.

Step 204: Calculate a predetermined sleep period.

Step 206: Convert the predetermined sleep period into cycles of the second clock signal CLK_2 and store a corresponding threshold value in the second register 88.

Step 208: Enable the sleep mode.

Step 210: Read the sleep mode status register.

Step 212: Before the first clock signal CLK_1 stops driving the MCU 68, determine if an external event is triggered to make the mobile unit 60 abort the sleep mode. If yes, go to step 220; otherwise, go to step 214.

Step 214: Is the sleep mode completed? If yes, go to step 216; otherwise, go back to step 210.

Step 216: Calculate an actual sleep period.

Step 218: Inform the scheduler 84 of the actual sleep period in order to recover timing of the mobile unit 60.

Step 220: Finish.

Operation of the sleep manager 82 is described as follows. Because the synchronous task 78 is an ISR corresponding to a highest priority, the synchronous task 78 is capable of interrupting other control procedures currently being executed by the mobile unit 60 when the synchronous task 78 is executed. The currently loaded control procedures are used to control operation of hardware in the mobile unit 60. Therefore, the sleep manager 82 is capable of checking if each of the currently loaded control procedures corresponds to an idle mode (step 202). If the sleep manager 82 judges that each currently loaded control procedure is idle, it means that the mobile unit 60 now is idle without performing any signal processing operation. Therefore, a sleep mode, which stops high-frequency clock signal driving the mobile unit 60, is activated to reduce power consumption of the mobile unit 60.

As mentioned above, the base station will deliver a paging signal to inform the mobile unit 60 of an incoming call. Therefore, the mobile unit 60 has to be on standby at certain times to be prepared for receiving the paging signal. The sleep manager 82 needs to calculate predetermined sleep period associated with the sleep mode to make sure that the mobile unit 60 can recover from the sleep mode in time to successfully receive the paging signal (step 204). The RTOS 71 will provide the sleep manager 82 with desired information and then the sleep manager 82 can figure out the predetermined sleep period. The predetermined sleep period is equal to an integral multiple of the frame period.

When the mobile unit 60 enters the sleep mode, the first clock signal CLK_1 stops driving the mobile unit 60. Therefore, the preferred embodiment utilizes a second clock signal CLK_2 to calculate running period of the sleep mode. In other words, the predetermined sleep period is further converted into cycles of the second clock signal CLK_2 (step 206). The amount of cycles is assigned to a threshold value. Suppose that the mobile unit 60 enters the sleep mode, and the second counter 76 starts counting the second clock signal CLK_2. If the second count value 77 is gradually increased from an initial value (0 for example) to equal the threshold value, it means that the mobile unit 60 has gone through the predetermined sleep period, and needs to escape from the sleep mode to be on standby.

After step 206 is completed, the sleep manager 82 drives the hardware of the mobile unit 60 to actuate the sleep mode (step 208), and then the sleep manager 82 reads information recorded in the sleep mode status register 92 to check what the operational status associated with the sleep mode is (step 210). In the preferred embodiment, the sleep mode status register 92 includes at least the following 4 statuses.

Status (a): After the sleep manager 82 activates the sleep mode, the mobile unit 60 is waiting for the first clock signal CLK_1 to be actually stopped from driving the mobile unit 60.

Status (b): During waiting for the first clock signal CLK_1 to be actually stopped from driving the mobile unit 60, that is, before the first clock signal CLK_1, which is commanded to stop driving the mobile unit 60, is actually stopped from driving the mobile unit 60, the mobile unit 60 is trigged by an external event to abort coming execution of the sleep mode.

Status (c): After the first clock signal CLK_1 has stopped driving the mobile unit 60, the mobile unit 60 is trigged by an external event to abort the currently executed sleep mode.

Status (d): After the first clock signal CLK_1 has stopped driving the mobile unit 60, the mobile unit 60 completely goes through the predetermined sleep period, and escapes from the sleep mode to be on standby.

In the preferred embodiment, when the sleep manager 82 actuates the sleep mode, the hardware of the mobile unit 60 does not actually enter the sleep mode. That is, the first clock signal CLK_1 is not immediately blocked from driving the mobile unit 60. The reason is described later. Therefore, when the sleep mode status register 92 is read and the recorded status corresponds to the status (a) listed above, it means that the sleep manager 82 is waiting for the hardware of the mobile unit 60 to actually enter the sleep mode. At this time, the first clock signal CLK_1 still drives the MCU 68.

If the sleep mode status register 92 is read and the recorded status corresponds to the status (b) listed above, it means that the mobile unit 60 received an external event before the hardware of the mobile unit 60 actually enters the sleep mode. Therefore, a corresponding control procedure should be executed by the MCU 68 to handle the external event. In other words, the mobile unit 60 is not allowed to enter the sleep mode. That is, the mobile unit 60 needs to abort the sleep mode operation that is ready to start. After step 212 is completed, step 220 is then performed to terminate operation of the sleep manager 82.

If the sleep mode status register 92 is read and the recorded status corresponds to the status (c) listed above, it means that the mobile unit 60 received an external event after the hardware of the mobile unit 60 has entered the sleep mode. The mobile unit 60 should escape from the sleep mode to handle the external event. Similarly, if the sleep mode status register 92 is read and the recorded status corresponds to the status (d) listed above, it means that the mobile unit 60 has successfully undergone a duration corresponding to the predetermined sleep period. In other words, the mobile unit 60 has escaped from the sleep mode, to be on standby. Therefore, according to step 214, an actual sleep period needs to be calculated after the sleep mode is terminated (step 216).

As mentioned above, if the mobile unit 60 corresponding to the status (c) escapes from the sleep mode, the actual sleep period is shorter than the predetermined sleep period. On the other hand, if the mobile unit 60 corresponding to the status (d) escapes from the sleep mode, the actual sleep period is equal to the predetermined sleep period. The calculation of the actual sleep period is described later.

In the end, information associated with the actual sleep period is delivered to the scheduler 84 (step 218). As mentioned above, the scheduler 84 is capable of commanding the hardware driver 80 of the following synchronous task 78 to perform the timing recovery operation. Therefore, after hardware driver 80 of the following synchronous task 78 is executed, the timing of the mobile unit 60 is then synchronized with the timing of the base station. In the preferred embodiment, the sleep manager 82 adopts a prior polling method (a loop formed by step 210, 212, 214) to check a status recorded by the sleep mode status register 92. Therefore, processing statuses and termination reasons associated with the sleep mode are acknowledged easily.

Figure 6:
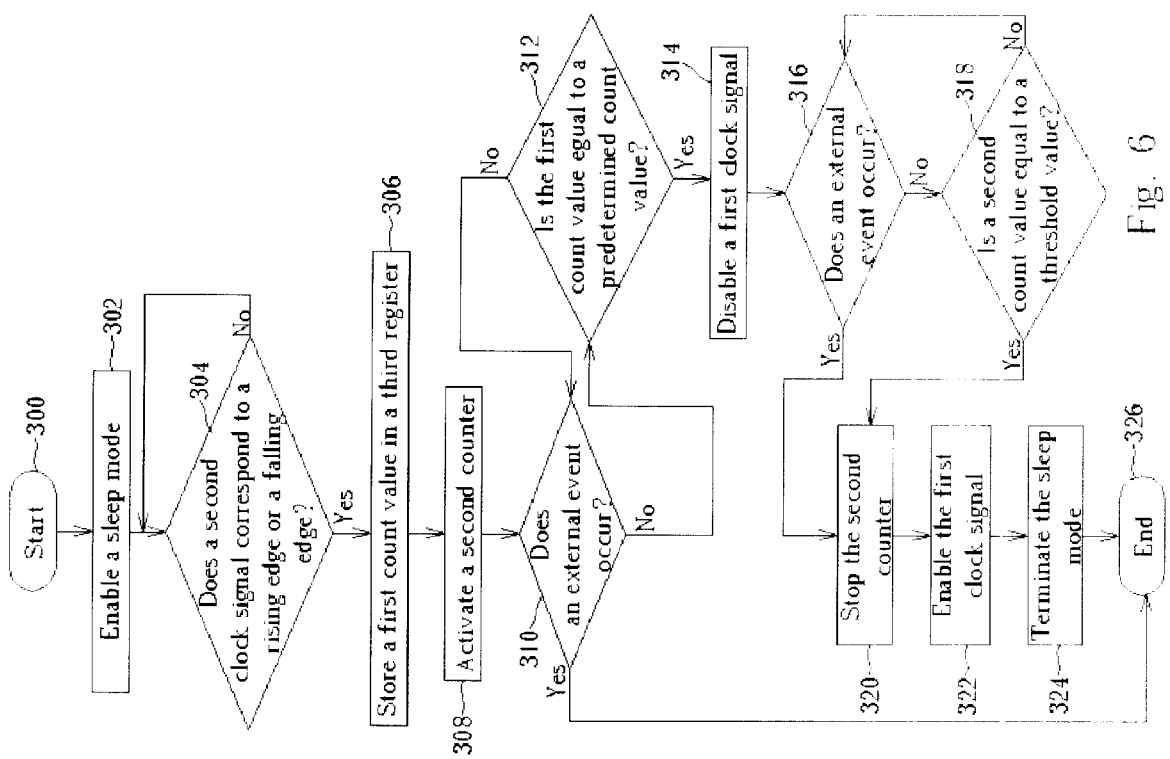
FIG. 6 is a flow chart illustrating the operation of the sleep mode performed by the mobile unit shown in FIG. 3.

Please refer to FIG. 6, which is a flow chart illustrating operation of the sleep mode performed by the mobile unit 60 shown in FIG. 3. Operation of the sleep mode performed by the mobile unit 60 includes following steps.

Step 300: Start.

Step 302: Does a voltage level of the second clock signal CLK_2 generated from the clock generator 72 correspond to either a rising edge or a falling edge? If yes, go to step 306; otherwise, perform step 304 repeatedly.

Step 306: The third register 90 records the first count value 75 currently counted by the first register 74.

Step 308: Active the second counter 76 to count the second clock signal CLK_2.

Step 310: Is the mobile unit 60 triggered by an external event? If yes, go to step 326; otherwise, go to step 312.

Step 312: Is the first count value 75 equal to the predetermined count value? If yes, go to step 314; otherwise, go to step 310.

Step 314: Disable the first clock signal CLK_1.

Step 316: Is the mobile unit 60 triggered by an external event? If yes, go to step 320; otherwise, go to step 318.

Step 318: Is the second count value 77 equal to the threshold value? If yes, go to step 320; otherwise, go to step 316.

Step 320: Disable the second counter 76.

Step 322: Restart the first clock signal CLK_1.

Step 324: Terminate the sleep mode.

Step 326: Finish.

The objective and operation of the above-mentioned flow of control is described as follows. According to step 208, shown in FIG. 5, the sleep manager 82 actuates operation of the sleep mode now. In addition, the mobile unit 60 starts controlling its hardware to operate properly to enter the sleep mode (step 302). As mentioned above, execution of the sleep mode can achieve an objective of saving power through stopping the first clock signal CLK_1 from driving the mobile unit 60. Therefore, when the MCU 68 ceases functioning, the second clock signal CLK_2 is necessary to count the running period associated with the sleep mode. Therefore, it needs to judge if a voltage level of the second clock signal CLK_2 corresponds to either a rising edge or a falling edge to trigger execution of following steps (step 304).

If the second clock signal CLK_2 has either the rising edge or the falling edge now, the first count value 75 currently calculated by the first counter 74 is recorded in the third register 90 (step 306) before the second counter 76 is activated to start counting the second clock signal CLK_2 (step 308). Then, the mobile unit 60 begins to detect if an external event occurs (step 310). If an external event triggers the mobile unit 60, the mobile unit 60 absolutely has to abort execution of the sleep mode to successfully handle the inputted external event. Otherwise, the mobile unit 60 checks if the first count value is equal to the predetermined count value. That is, when the frame period watched by the sleep manager 82 is over, the mobile unit 60 actually enters the sleep mode. In other words, when one corresponding frame is over, the mobile unit 60 then disables the first clock signal CLK_1, and enters the sleep mode (step 314).

Suppose that the mobile unit 60 has entered the sleep mode. If the mobile unit 60 is triggered by an external event before the mobile unit 60 completely goes through the predetermined sleep period, the mobile unit 60 performs step 320 to stop timing execution of the sleep mode. Therefore, the mobile unit 60 continuously detects for an occurrence of the external event (step 316) until the second count value 77 is equal to the threshold value and the predetermined sleep period is passed (step 318). After the second counter 76 stops counting cycles of the second clock signal CLK_2, the first clock signal CLK_1 starts driving the mobile unit 60 again to make the mobile unit 60 leave the sleep mode and operate normally.

It is noteworthy that after step 302 is executed, the mobile unit 60 forces the sleep mode status register 92 to record the status (a). After an external event is detected through step 310, the mobile unit 60 forces the sleep mode status register 92 to record the status (b). After an external event is detected through step 316, the mobile unit 60 forces the sleep mode status register 92 to record the status (c). After step 318 is executed, the mobile unit 60 forces the sleep mode status register 92 to record the status (d). After the mobile unit 60 enters the sleep mode, the MCU 68 is not driven by the first clock signal CLK_1 so that the sleep manager 82 is paused. That is, when the mobile unit 60 enters the sleep mode, the sleep manager 82 is immediately interrupted with no clock signal. Actually, the sleep manager 82 cannot know its operational statuses. Therefore, the preferred embodiment utilizes information stored in the sleep mode status register 92 to represent operational statuses and termination reasons associated with the sleep mode. After the mobile unit 60 leaves the sleep mode, the paused sleep manager 82 then starts working. At this time, the sleep manager 82 is capable of acknowledging that the sleep mode has been completed or has been aborted, and then the sleep manager 82 figures out an actual sleep period (step 218 shown in FIG. 5).

The preferred embodiment makes use of the first count value 75 stored through step 306, the second count value 77 recorded through step 320, and the predetermined count value used by the first counter 74 to calculate the actual sleep period. For instance, suppose that frequency of the first clock signal CLK_1 is represented by f1, frequency of the second clock signal CLK_2 is represented by f2, the first count value 75 corresponding to step 306 is represented by OLD_COUNT, the second count value 77 corresponding to step 320 is represented by SEC_COUNT, and the predetermined count value corresponding to the first count value 74 is represented by WRAP_THRESHOLD. The actual sleep period counted by cycles of the first clock signal CLK_1 is shown as follows.

$$SEC\_COUNT * \frac{f1}{f2} - (WRAP\_THRESHOLD - OLD\_COUNT)$$

Therefore, the scheduler 84 commands the hardware driver 80 of the next synchronous task 78 to adjust the predetermined count value used by the first counter 74 according to cycles of the first clock signal CLK_1 that is equivalent to the actual sleep period. After the mobile unit 60 leaves the sleep mode, the timing of the mobile unit 60 is then synchronized with the timing of the base station again.

Figure 7:
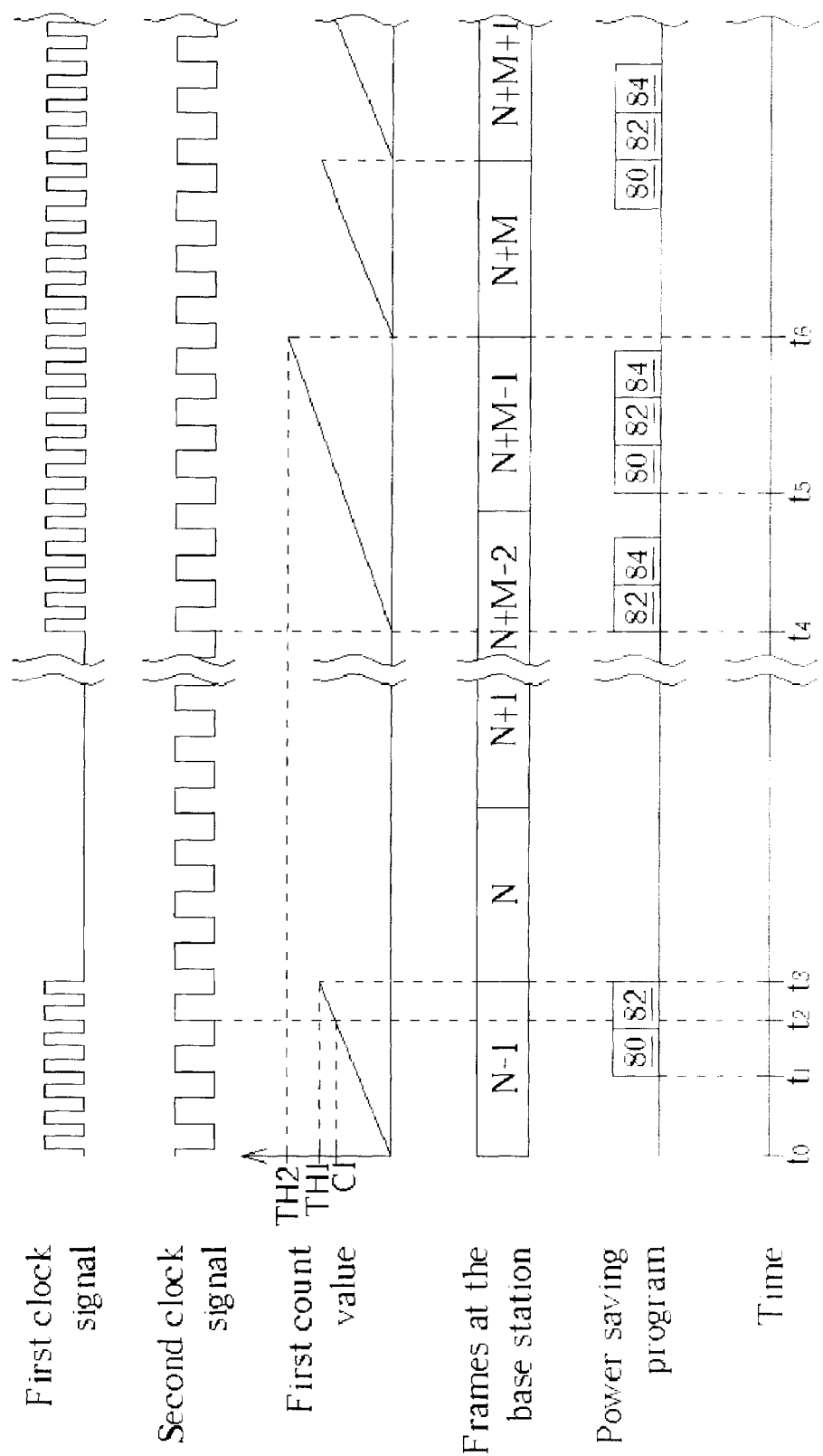
FIG. 7 is a diagram illustrating the timing recovery operation performed by the mobile unit shown in FIG. 3.

Please refer to FIG. 7 in conjunction with FIG. 3. FIG. 7 is a diagram illustrating the timing recovery operation performed by the mobile unit 60 shown in FIG. 3. The waveforms listed from top to bottom sequentially represent the first clock signal CLK_1, the second clock signal CLK_2, the first count value 75, frames run at the base station, the synchronous task 78, and time.

Suppose that the timing of the mobile unit 60 is initially synchronized with the timing of the base station when frame N−1 run at the base station begins. At time t0, the first counter 74 counts the first clock signal CLK_1 from an initial value such as zero. At time t1, the MCU 68 starts executing the synchronous task 78 because the MCU 68 is triggered by an interrupt. The synchronous task 78 includes a hardware driver 80, a sleep manager 82, and a scheduler 84. The hardware driver 80, the sleep manager 82, and the scheduler 84 are simply represented by numbers 80, 82, 84 shown in FIG. 7. Because the timing of the mobile unit 60 is currently synchronized with the timing of the base station, the hardware driver 80 does not need to modify the predetermined count value used by the first counter 74. With regard to the first counter 74, it still counts the first clock signal CLK_1 until the first count value 75 is equal to the predetermined count value TH1.

When the sleep manager 82 determines that the mobile unit 60 can enter the sleep mode, the mobile unit 60 at time t2 (the second clock signal corresponds to either the rising edge or the falling edge) records currently counted first count value 75 into the third register 90 (step 306 shown in FIG. 6). That is, the third register 90 records a value C1. Then, the mobile unit 60 starts activating the second counter 76 to count the second clock CLK_2 (step 308 shown in FIG. 6). At this time, the first count value 75 does not equal the predetermined count value TH1 yet. Therefore, the first clock signal CLK_1 still continues driving the mobile unit 60 until the mobile unit 60 enters the sleep mode at time t3. At that time, the sleep manager 82 is paused owing to the disabled MCU 68. When the mobile unit 60 terminates the sleep mode at time t4 because the sleep mode is aborted or is normally ended, the second count value 77 records a value C2 corresponding to an interval between time t2 and t4. At the same time, the first counter 74 counts the first clock signal CLK_1 from an initial value to calculate the first count value 75.

It is obvious that time t4 is not exactly the beginning time of the frame N+M−2 referenced by the base station. That is, when the mobile unit 60 leaves the sleep mode, the timing of the mobile unit 60 is deviated from timing of the base station. Therefore, the sleep manager 82 calculates cycles of the first clock signal CLK_1 corresponding to the actual sleep period based on the above-mentioned formula, that is, $$SEC\_COUNT * \frac{f1}{f2} - (WRAP\_THRESHOLD - OLD\_COUNT).$$

The amount of cycles is further represented by $$C2 * \frac{f1}{f2} - (TH1 - C1),$$

where the frequency of the first clock signal CLK_1 is represented by f1 and the frequency of the second clock signal CLK_2 is represented by f2. In order to conveniently illustrate features of the present invention, please note that the frequency of the first clock signal CLK_1 shown in FIG. 7 is twice as high as the frequency of the second clock signal CLK_2 shown in FIG. 7. However, the first clock signal CLK_1 and the second clock signal CLK_2 in the preferred embodiment can correspond to any ratio for achieving the objective of counting a period of time.

The sleep manager 82 then informs the scheduler 84 of the calculated result. Therefore, the scheduler 84 is capable of commanding the hardware driver 80 run at time t5 to further adjust originally adopted predetermined count value TH1 to be TH2. It is noteworthy that the first count value 75 cannot match the predetermined count value TH1 at time t5 because the difference between time t4 and time t5 is always shorter than each frame time referenced by the base station. Therefore, the first count value 75 is increased continuously after time t5 until the first count value 75 is reset to correspond to the initial value at time t6.

As shown in FIG. 7, the timing of the mobile unit is synchronized with the timing of the base station at time t6. During the following frame N+M referenced by the base station, the mobile unit 60 adopts the original predetermined count value TH1 to calculate a frame period to know the beginning time and the finish time associated with the frame N+M.

In the preferred embodiment, please note that the sleep manager 82 is executed after the hardware driver 80, and the sleep manager 82 is executed before the scheduler 84. During a period when the mobile unit 60 enters the sleep mode and performs a corresponding timing recovery operation, the execution sequence mentioned above is easy to implement and the corresponding performance is optimum. However, even though the execution sequence associated with the hardware driver 80, the sleep manager 82, and the scheduler 84 is modified, the sleep manager 82 is also capable of achieving the same objectives of controlling execution of the sleep mode and operation of recovering timing of the mobile unit 60. In addition, each of the first register 86, the second register 88, the third register 90, the sleep mode status register 92, the first counter 74, and the second counter 76 in the preferred embodiment is an independent circuit. However, the circuits can be integrated into other circuits of the mobile unit 60 to perform their functionality. For example, the first counter 74 can be integrated with the clock generator 66, or the second counter 76 can be integrated with the clock generator 72.

In contrast to the prior art, the claimed method for controlling the timing of a mobile unit uses one interrupt service routine with a highest priority to simultaneously control an execution of the sleep mode and an operation of recovering timing. Because the interrupt service routine has the highest priority, associated operations (timing recovery operation for example) run by the used interrupt service routine are not allowed to be interrupted by other programs or other interrupt service routines. Therefore, the mobile unit, a cellular phone for example, performs the sleep mode more efficiently to reduce power consumption of the mobile unit so that life of the battery is extended. To sum up, the claimed method provides a simple scheme and an efficient way to manage operation of the sleep mode.

Those skilled in the art will readily observe that numerous modifications and alterations of the device may be made while retaining the teachings of the invention. Accordingly, the above disclosure should be construed as limited only by the metes and bounds of the appended claims.

The invention claimed is:

1. A method for controlling timing of a mobile unit, the mobile unit connected to a base station via radio communication, the base station transmitting wireless signals to the mobile unit according to a plurality of frames within a communication system, the mobile unit comprising:

a micro-controller unit for running a real-time operating system to load a plurality of control procedures used to control operation of the mobile unit, the control procedures including a synchronous task;

a timing generator electrically connected to the micro-controller unit for controlling timing of the mobile unit corresponding to the frames; and a clock generator electrically connected to the micro-controller unit for generating a first clock signal to drive the micro-controller unit;

the method comprising:

using the micro-controller unit to execute the synchronous task for interrupting other control procedures currently loaded by the real-time operating system, and using the synchronous task to calculate a predetermined sleep period for a sleep mode that is used to stop the first clock signal from driving the micro-controller unit;

using the micro-controller unit to execute the synchronous task for driving the mobile unit to stop the first clock signal from driving the micro-controller unit during an actual sleep period; and using the micro-controller unit to execute the synchronous task for controlling the timing generator to synchronize timing of the mobile unit with timing of the base station according to the actual sleep period.

2. The method of claim 1 further comprising:

executing the synchronous task for determining whether each of other loaded control procedures corresponds to an idle status to drive the mobile unit to enter the sleep mode.

3. The method of claim 1 wherein the synchronous task is an interrupt service routine that has a highest priority among the control procedures.

4. The method of claim 1 wherein the predetermined sleep period is an integral multiple of a period of a frame.

5. The method of claim 1 wherein the mobile unit further comprises a sleep mode status register for recording information corresponding to an operational status of the sleep mode.

6. The method of claim 5 further comprising:

executing the synchronous task for reading the information recorded in the sleep mode status register to decide whether the mobile unit needs to abort the sleep mode before entering the sleep mode.

7. The method of claim 5 further comprising:

executing the synchronous task for reading the information recorded in the sleep mode status register to decide whether the mobile unit needs to abort the sleep mode after entering the sleep mode.

8. The method of claim 7 further comprising:

terminating the sleep mode when an external event triggers the mobile unit.

9. The method of claim 7 further comprising:

terminating the sleep mode after the mobile unit enters the sleep mode and undergoes the predetermined sleep period.

10. The method of claim 3 wherein the clock generator further generates a second clock signal for counting the actual sleep period of the sleep mode after the mobile unit enters the sleep mode.

11. The method of claim 10 wherein the mobile unit further comprises:

a first counter electrically connected to the clock generator for counting cycles of the first clock signal to generate a first count value, the first count value being stored in a first register, the first count value being reset to an initial value for re-counting the first clock signal when the first count value is increased from the initial value to achieve a predetermined count value, when the first count value is reset being a timing used to distinguish two adjacent frames; and a second counter electrically connected to the clock generator for counting cycles of the second clock signal to generate a second count value.

12. The method of claim 11 further comprising:

calculating a threshold value that is a total amount of cycles of the second clock signal corresponding to the predetermined sleep period, and storing the threshold value into a second register.

13. The method of claim 12 further comprising:
after the threshold value is calculated, activating the second counter to count cycles of the second clock signal, and simultaneously storing the first count value currently counted by the first counter in a third register.

14. The method of claim 13 further comprising:
calculating the actual sleep period according to the threshold value stored in the second register, the first count value stored in the third register, and the second count value.

15. The method of claim 12 further comprising:
if the second count value equals the threshold value or the mobile unit is triggered by an external event, stopping the second counter and terminating the sleep mode for making the first clock signal drive the micro-controller unit.

16. The method of claim 11 further comprising:
when the first count value counted by the first counter reaches the predetermined count value, controlling the mobile unit to start entering the sleep mode to stop the first clock signal from driving the micro-controller unit.

17. The method of claim 10 wherein a frequency of the first clock signal is greater than a frequency of the second clock signal.

18. The method of claim 1 wherein the synchronous task comprises:
a hardware driver for controlling a hardware setting of the mobile unit;
a sleep manager for controlling operation of the sleep mode; and
a scheduler for commanding the hardware driver to control the mobile unit.

19. The method of claim 18 further comprising:
executing the sleep manager before the hardware driver, and executing the scheduler before the sleep manager.

20. The method of claim 19 wherein the synchronous task is repeatedly executed for controlling the mobile unit to enter the sleep mode, and the scheduler run in a first synchronous task controls the hardware driver run in a second synchronous task following the first synchronous task.

21. The method of claim 1 wherein the mobile unit is a cellular phone.

22. A method for controlling timing of a mobile unit, the mobile unit connected to a base station via radio communication, the base station transmitting wireless signals to the mobile unit according to a plurality of frames within a communication system, the mobile unit comprising:
a micro-controller unit for running a real-time operating system to load a plurality of control procedures used to control operation of the mobile unit, the control procedures including a synchronous task;
a timing generator electrically connected to the micro-controller unit for controlling timing of the mobile unit corresponding to the frames; and
a clock generator electrically connected to the micro-controller unit for generating a first clock signal to drive the micro-controller unit;
the method comprising:
using the micro-controller unit to assign a highest priority to the synchronous task among the control procedures;
using micro-controller unit to execute the synchronous task for calculating a predetermined sleep period for a sleep mode that is used to stop the first clock signal from driving the micro-controller unit;
using the micro-controller unit to execute the synchronous task for driving the mobile unit to stop the first clock signal from driving the micro-controller unit during an actual sleep period; and
using the micro-controller unit to execute the synchronous task for controlling the timing generator to synchronize timing of the mobile unit with timing of the base station according to the actual sleep period.

23. A method for controlling timing of a mobile unit, the mobile unit connected to a base station via radio communication, the base station transmitting wireless signals to the mobile unit according to a plurality of frames within a communication system, the mobile unit comprising:
a micro-controller unit for running a real-time operating system to load a plurality of control procedures used to control operation of the mobile unit, the control procedures including a synchronous task;
a timing generator electrically connected to the micro-controller unit for controlling timing of the mobile unit corresponding to the frames; and
a clock generator electrically connected to the micro-controller unit for generating a first clock signal to drive the micro-controller unit;
the method comprising:
using the micro-controller unit to assign a first priority to the synchronous task among the control procedures, the first priority not corresponding to a lowest priority;
using micro-controller unit to execute the synchronous task for calculating a predetermined sleep period for a sleep mode that is used to stop the first clock signal from driving the micro-controller unit;
using the micro-controller unit to execute the synchronous task for driving the mobile unit to stop the first clock signal from driving the micro-controller unit during an actual sleep period; and
using the micro-controller unit to execute the synchronous task for controlling the timing generator to synchronize timing of the mobile unit with timing of the base station according to the actual sleep period.

24. The method of claim 1, wherein the communication system is a time division multiple access (TDMA) system, a wideband code division multiple access (WCDMA) system, or a code division multiple access (CDMA) system.

25. The method of claim 22, wherein the communication system is a time division multiple access (TDMA) system, a wideband code division multiple access (WCDMA) system, or a code division multiple access (CDMA) system.

26. The method of claim 23, wherein the communication system is a time division multiple access (TDMA) system, a wideband code division multiple access (WCDMA) system, or a code division multiple access (CDMA) system.

* * * * *